United States Patent [19]
Petersen et al.

[11] Patent Number: 5,539,646
[45] Date of Patent: Jul. 23, 1996

[54] METHOD AND APPARATUS FOR AN AGV INERTIAL TABLE HAVING AN ANGULAR RATE SENSOR AND A VOLTAGE CONTROLLED OSCILLATOR

[75] Inventors: John A. M. Petersen, Centerville; Gary L. Whatcott; Paul Carter, both of Salt Lake City, all of Utah

[73] Assignee: HK Systems Inc., Brookfield, Wis.

[21] Appl. No.: 143,334

[22] Filed: Oct. 26, 1993

[51] Int. Cl.[6] .......................... G01C 21/18; G06F 9/455
[52] U.S. Cl. .................... 364/453; 364/424.02; 318/587; 395/500; 180/168
[58] Field of Search ........................... 364/453, 424.02; 318/587; 340/825.06; 180/167, 168

[56] References Cited

U.S. PATENT DOCUMENTS

| | | | |
|---|---|---|---|
| 1,799,576 | 4/1931 | Wildhaber . | |
| 2,246,385 | 6/1941 | Schaper | 250/40 |
| 3,009,525 | 11/1961 | De Liban | 180/82 |
| 3,033,305 | 5/1962 | Harned et al. | 180/79.1 |
| 3,147,817 | 9/1964 | De Liban | 180/82 |
| 3,187,260 | 6/1965 | Dove | 328/57 |
| 3,198,279 | 8/1965 | Quinn | 180/79 |
| 3,431,996 | 3/1969 | Giles et al. | 180/98 |
| 3,544,788 | 12/1970 | Guzik | 246/63 |
| 3,556,244 | 1/1971 | Gray | 180/98 |

(List continued on next page.)

FOREIGN PATENT DOCUMENTS

| | | | |
|---|---|---|---|
| 7030481 | 5/1985 | Australia | H03H 17/06 |
| 50101 | 1/1981 | European Pat. Off. | G05D 1/02 |
| 077985 | 5/1983 | European Pat. Off. | G01C 21/12 |
| 108812 | 5/1984 | European Pat. Off. | H03M 1/00 |
| 124260 | 11/1984 | European Pat. Off. | H04B 3/56 |
| 193985 | 9/1986 | European Pat. Off. | G05D 1/02 |
| 206443 | 12/1986 | European Pat. Off. | H04L 27/00 |
| 2336726 | 7/1977 | France | G05D 1/00 |
| 2375579 | 7/1978 | France | G01C 19/38 |
| 2526181 | 4/1983 | France | G05D 1/02 |
| 2428583 | 1/1976 | Germany | H01Q 21/12 |
| 2722222 | 3/1978 | Germany | G05D 1/02 E |
| 2801045 | 9/1978 | Germany | G01C 21/00 |
| 2833897 | 3/1979 | Germany | H04L 27/10 |
| 2947116 | 7/1980 | Germany . | |
| 2920181 | 11/1980 | Germany | G05D 1/03 |
| 3136355 | 3/1983 | Germany | G06F 15/16 |
| 56-118602 | 9/1981 | Japan | G01B 7/00 |
| 9-135514 | 8/1984 | Japan | G05D 1/03 |
| 61-112215 | 5/1986 | Japan | G05D 1/02 |
| 50-650538 | 3/1908 | U.S.S.R. | A01B 69/04 |
| 2143395 | 5/1984 | United Kingdom | G01S 17/02 |
| 2158965 | 5/1984 | United Kingdom | G05D 1/02 |
| 8501012 | 1/1985 | United Kingdom . | |
| WO80/02013 | 10/1980 | WIPO | B62D 5/00 |

OTHER PUBLICATIONS

Japanese Abstract vol. 5, No. 66, May 2, 1981.
IBM Publ. vol. 27, No. 4A, Sep. 1984.
German Publ. "Rechnergestutzte...".
German Publ. "Rauscharme...".
Nov. 1990 article in Material Handling Engineering entitled "AGVS: Latest Developments in Guidance Systems".
Cyplex Literature: High Performance AGV Guidance and Communications;.
Wiredriver 2 Users Guide.

*Primary Examiner*—Kevin J. Teska
*Assistant Examiner*—Russell W. Frejd
*Attorney, Agent, or Firm*—Nilles & Nilles

[57] ABSTRACT

A low-cost solid state replacement circuit for an inertial platform with the resulting consequence of increased resolution, significantly reduced cost, and improved reliability and accuracy. The invention comprises no moving parts and permits the use of a strap-down angular rate sensor system which has a fixed orientation relative to an AGV on which the circuit is used. The invention creatively emulates encoder signals previously emanating from the inertial table through the use of a voltage controlled oscillator, a direction of turn determining circuit and an encoder emulator. Cabling which exists in current inertial tables does not need to be changed and information format previously used remains unchanged.

19 Claims, 8 Drawing Sheets

U.S. PATENT DOCUMENTS

| | | | |
|---|---|---|---|
| 3,617,769 | 11/1971 | Hanson | 307/229 |
| 3,628,624 | 12/1971 | Waerner | 180/98 |
| 3,683,378 | 8/1972 | Polhemus | 343/7 ED |
| 3,693,028 | 9/1972 | Fussell | 307/235 |
| 3,734,229 | 5/1973 | Comer | 180/98 |
| 3,757,887 | 11/1973 | Moore | 180/98 |
| 3,773,136 | 11/1973 | Palazetti | 180/98 |
| 3,849,636 | 11/1974 | Helms | 235/150.27 |
| 4,007,382 | 2/1977 | Warberg | 307/236 |
| 4,010,409 | 3/1977 | Wailes | 318/587 |
| 4,020,487 | 4/1977 | Winter | 340/347 NT |
| 4,023,753 | 5/1977 | Dobler | 246/5 |
| 4,043,418 | 8/1977 | Blakeslee | 180/98 |
| 4,083,008 | 4/1978 | Eschke | 325/163 |
| 4,088,939 | 5/1978 | Mitschke | 318/376 |
| 4,097,808 | 6/1978 | Parke | 325/51 |
| 4,127,182 | 11/1978 | Thole | 180/98 |
| 4,215,759 | 8/1980 | Diaz | 180/168 |
| 4,222,008 | 9/1980 | Mezrich | 328/28 |
| 4,247,896 | 1/1981 | Schmelbel | 364/436 |
| 4,253,541 | 3/1981 | Iida et al. | 180/168 |
| 4,258,813 | 3/1981 | Rubel | 180/168 |
| 4,260,990 | 4/1981 | Lichtblau | 343/742 |
| 4,284,160 | 8/1981 | Liban | 180/168 |
| 4,284,941 | 8/1981 | Regueiro | 318/587 |
| 4,307,329 | 12/1981 | Taylor | 318/587 |
| 4,310,789 | 1/1982 | Mank et al. | 318/587 |
| 4,322,670 | 3/1982 | Taylor | 318/587 |
| 4,333,024 | 6/1982 | Maussion | 307/351 |
| 4,361,202 | 11/1982 | Minovitch | 180/168 |
| 4,454,583 | 6/1984 | Schneiderhan et al. | 1.364/449 |
| 4,472,716 | 9/1984 | Hansen | 340/905 |
| 4,535,294 | 8/1985 | Ericksen et al. | 328/150 |
| 4,556,864 | 12/1985 | Roy | 340/310 A |
| 4,593,238 | 6/1986 | Yamamoto | 318/587 |
| 4,593,239 | 6/1986 | Yamamoto | 318/587 |
| 4,613,804 | 9/1986 | Swenson | 318/587 |
| 4,613,973 | 9/1986 | Dahl | 375/37 |
| 4,630,216 | 12/1986 | Tyler et al. | 364/478 |
| 4,658,928 | 4/1987 | Seo | 180/168 |
| 4,700,302 | 10/1987 | Arakawa et al. | 364/424 |
| 4,711,316 | 12/1987 | Katou et al. | 180/168 |
| 4,727,492 | 2/1988 | Reeve et al. | 364/424 |
| 4,731,867 | 3/1988 | Seabury | 455/41 |
| 4,742,283 | 5/1988 | Bolger et al. | 318/587 |
| 4,751,516 | 6/1988 | Lichtblau | 343/742 |
| 4,777,601 | 10/1988 | Boegli | 364/424.02 |
| 4,791,570 | 12/1988 | Sherman et al. | 364/436 |
| 4,800,978 | 1/1989 | Wasa et al. | 180/168 |
| 4,811,229 | 3/1989 | Wilson | 364/424.02 |
| 4,847,769 | 7/1989 | Reeve | 364/424.02 |
| 4,847,774 | 7/1989 | Tomikawa et al. | 364/449 |
| 4,902,948 | 2/1990 | Sherman et al. | 318/580 |
| 4,908,557 | 3/1990 | Sudare et al. | 318/587 |
| 4,939,650 | 7/1990 | Nishikawa | 364/424.02 |
| 4,939,651 | 7/1990 | Onishi | 364/424.02 |
| 4,987,540 | 1/1991 | Luke, Jr. | 364/424.02 |
| 4,993,507 | 2/1991 | Ohkura | 180/168 |
| 4,996,408 | 2/1991 | Field | 318/587 |
| 5,000,279 | 3/1991 | Konda et al. | 180/168 |
| 5,023,790 | 6/1991 | Luke, Jr. | 364/424.02 |
| 5,281,901 | 1/1994 | Yardley et al. | 318/587 |
| 5,341,130 | 8/1994 | Yardley et al. | 340/825.06 |

| FIGURE 2A | FIGURE 2B |
FIGURE 2
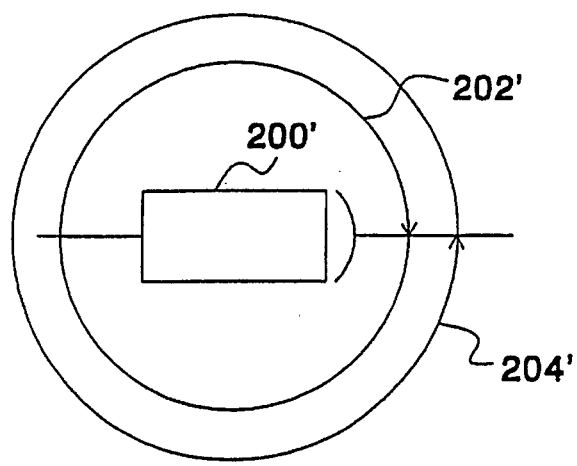
FIGURE 3
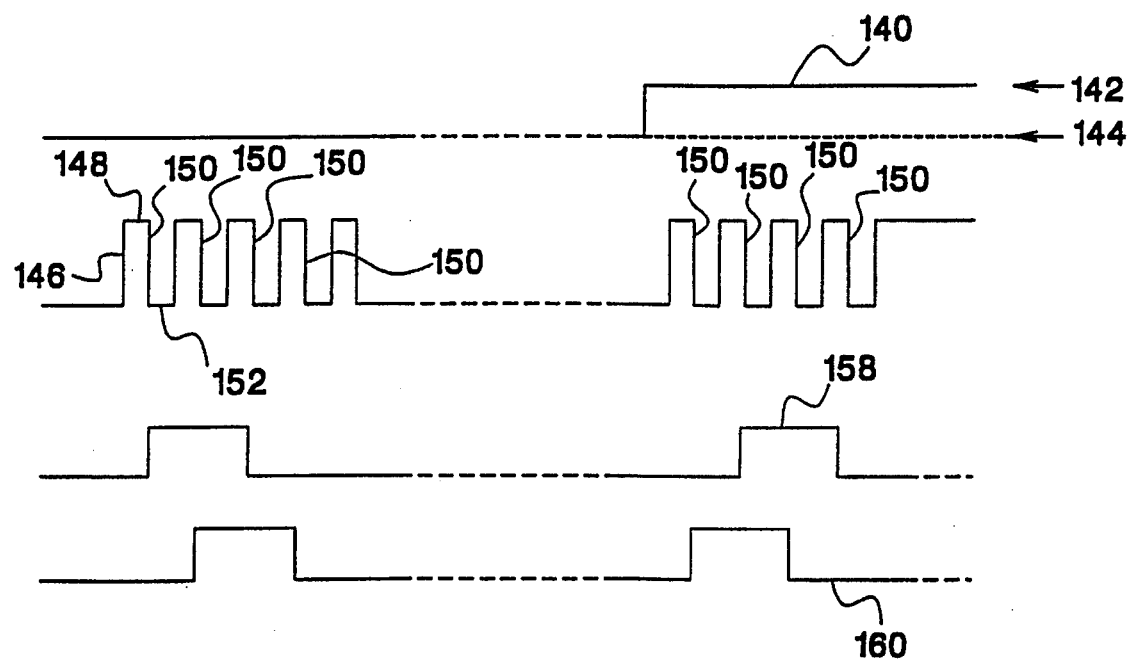
FIGURE 4

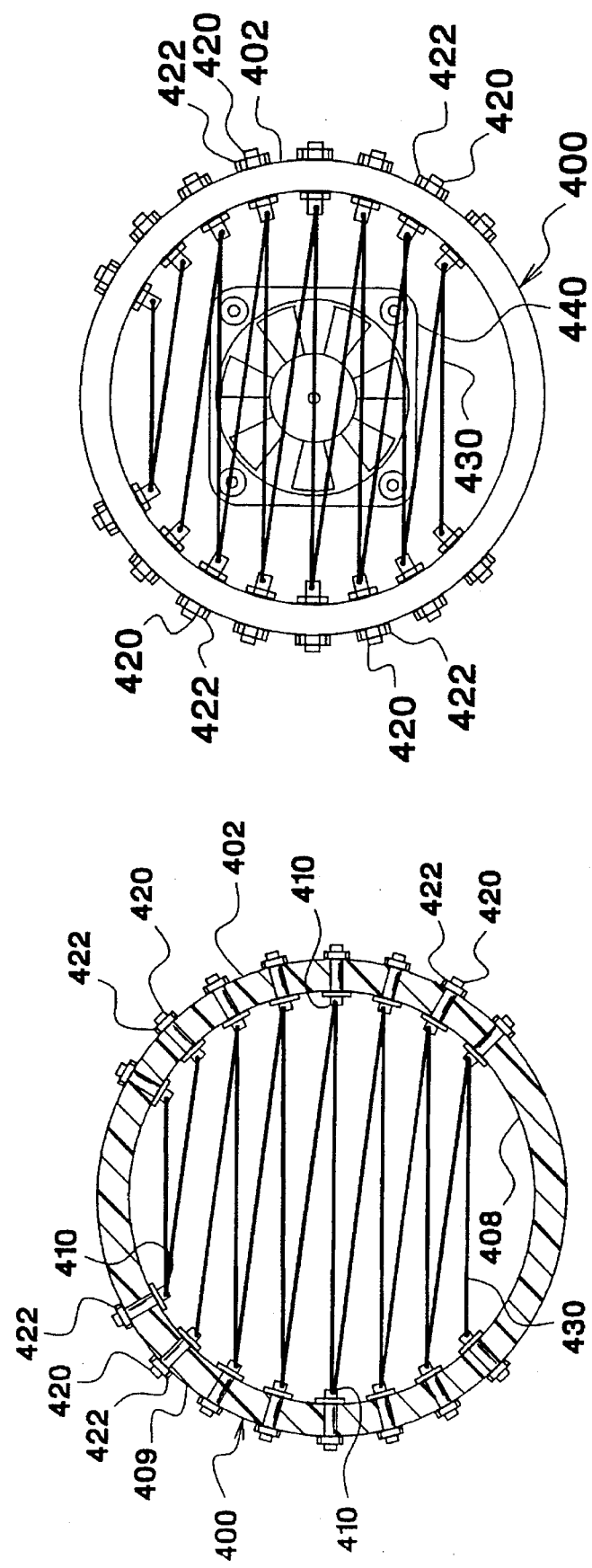

5,539,646

METHOD AND APPARATUS FOR AN AGV INERTIAL TABLE HAVING AN ANGULAR RATE SENSOR AND A VOLTAGE CONTROLLED OSCILLATOR

FIELD OF INVENTION

This invention relates to navigation and guidance systems for Automated Guided Vehicles (AGV's) and more particularly to guidance platforms which are stationary relative to an AGV on which the platforms are mounted.

DESCRIPTION OF RELATED ART

Free ranging driverless AGV's are becoming well known and widely used in autonomous operation in factory and inventory storage and acquisition environments. An example of such an AGV is disclosed in a copending U.S. patent application Ser. No. 07/621,488, entitled DOWNWARD COMPATIBLE AGV SYSTEM AND METHODS, filed Dec. 3, 1990, by Yardley, et al.

In application Ser. No. 07/621,488, an AGV is disclosed which comprises an inertial platform which provides a source of angular measurements used in combination with estimates of AGV position as the AGV moves along a path during normal operation. Importantly, the AGV employs the angular measurements to provide sufficient precision and accuracy during free ranging travel to maintain an acceptable guidepath error between precise updates from a reference site, such as an update marker. Acceptable guidepath error has been established as an error having a standard deviation of two inches in fifty feet of free ranging AGV travel.

A major element in measuring angular rate within acceptable accuracy limits is an inertial table which continuously drives the angular displacement of an angular rate sensor relative to a predetermined fixed heading to a null position to restrict the angle through which the angular rate sensor must be accurately used. Such an inertial table necessarily requires employing moving parts to so restrain the angular rate sensor to the desired relatively fixed heading.

Necessarily the inertial table requires moving parts comprising a DC brush, slip rings, high precision machining, high precision bearings, an encoder, shock mounts, and motor rotors plus a control system to maintain the heading. In addition, providing a useful inertial table requires intensive assembly procedures and time-consuming balancing and calibration procedures. Another problem in using the inertial table is stability of the table itself. For a suitably accurate system, gain of the table control loop must be very high. High gain can be a source of instability which commonly results in additional errors and occasionally failure of table operation.

It has been established that a required resolution of the encoder of the inertial table is 7200 ticks per revolution, which relates to 0.05° per tick. A tick is defined as one count of a two channel square wave signal where each channel is 90° out of phase, using quadrature counting (i.e. counting each transition of each square wave).

As the overall cost of guidance equipment on the AGV is a sensitive and important variable in competitive positioning, relatively high cost of such an inertial table plus the more difficult but real factor of relative unreliability of potentially superfluous moving parts on an AGV makes the inertial table a prime target for replacement.

BRIEF SUMMARY AND OBJECTS OF THE INVENTION

In brief summary, this novel invention alleviates all of the known problems related to employment of an inertial table or platform having moving parts in conjunction with an angular rate sensor on an AGV. This invention replaces moving parts of the inertial platform with the resulting consequence of increased resolution, significantly reduced cost, and improved reliability and accuracy. The invention comprises only solid state circuits and no moving parts and permits the use of a strap-down angular rate sensor system which has a fixed orientation relative to the AGV.

The invention creatively emulates encoder signals previously emanating from the inertial table through the use of a voltage controlled oscillator (VCO). By so doing, cabling which exists in current inertial tables does not need to be changed and information format previously used remains unchanged which is desirable for replacement of existing inertial platforms.

Accordingly, it is a primary object to provide method and apparatus for replacing an AGV inertial table which comprises moving parts with a solid state system subsystem which performs a like function with greater reliability and accuracy at lower cost.

It is an important object to provide a cable connection from the solid state subsystem which directly replaces a similar connection from the replaced AGV inertial table.

It is another important object to provide a method of calibration of the solid state inertial table replacement subsystem which permits the use of relatively low cost electronic components.

These and other objects and features of the present invention will be apparent from the detailed description taken with reference to accompanying drawings.

BRIEF DESCRIPTION OF THE DRAWINGS

FIG. 2 is a schematic diagram showing relative position of FIGS. 2A and 2B.

FIG. 3 is a schematic showing direction and angular distance of turns executed to calibrate the solid state circuit inertial table replacement of FIG. 1.

FIG. 4 is a waveform diagram showing corresponding time oriented changes of state of a sign signal, a binary oscillating signal and two related signals which are logical functions of the signal and oscillating signals.

FIG. 7 is a section in a plane near heat producing wires of a temperature control enclosure which is used to control the temperature controlled parts seen in FIGS. 1 and 2A.

FIG. 8 is a top elevation of the enclosure of FIG. 7 with a cover removed.

DETAILED DESCRIPTION OF THE ILLUSTRATED EMBODIMENTS

Following is a detailed description of an embodiment of a solid state replacement for an inertial platform which increases resolution, costs significantly less to manufacture, test and employ, and has improved reliability and accuracy compared to an inertial platform comprising moving parts. The replacement is employed as a strap-down subsystem aboard an operating unmanned AGV. In the disclosed embodiment, the subsystem is at least accurate to 0.1° per each fifty feet of travel. Relative to rate of travel of an AGV, the slowest angular velocity which is of interest is 0.1° in 50 feet of travel, with a rate of AGV travel of 150 feet per minute. Such an angular velocity is approximately 0.005°/second compared with rate of earth angular velocity of approximately 0.0025°/second. The maximum rotation rate of an AGV is approximately 60°/second.

To be able to sense a 0.0025°/second rate directly from a 100°/second sensor requires an analog-to-digital converter having a seventeen bit accuracy. Such analog-to-digital converters are currently relatively expensive compared to the circuit for the strap-down subsystem of the instant invention described in detail hereafter. Also such direct sensing produces a binary sample which is not compatible with input from an inertial table, as generally currently mechanized, requiring a non-standard or previously undefined type of input to a navigation and guidance microprocessor on board the AGV. However, by emulating an encoder signal as currently used in inertial table-to-microprocessor communication, existing AGV programming and interfacing cabling remains unchanged.

In the currently preferred embodiment, the emulation is accomplished through the use of a voltage controlled oscillator (VCO). In order to achieve a resolution of 0.01° resolution per tick, 100 ticks per degree must be sensed. For a rate of 100° per second, resolution must be 10,000 ticks per second (100 second times 100 ticks/°). As understood by one skilled in the art, resolution of 10,000 ticks per second implies 2,500 Hz for each emulated encoder channel. For example, 2500 Hz for each channel and 90° out of phase requires dividing a 10,000 Hz pulse rate by four. It should be noted that earth rate yields one tick in four seconds (0.0025°/second times 100 ticks per degree =0.25 ticks per second).

Currently available sensors can be readily employed with the invention in a strap-down mode, a strap-down mode being defined as a mode in which a strap-down system has a fixed orientation relative to the AGV, unlike inertial platforms which move relative to the AGV as the AGV changes direction.

Figure 1:
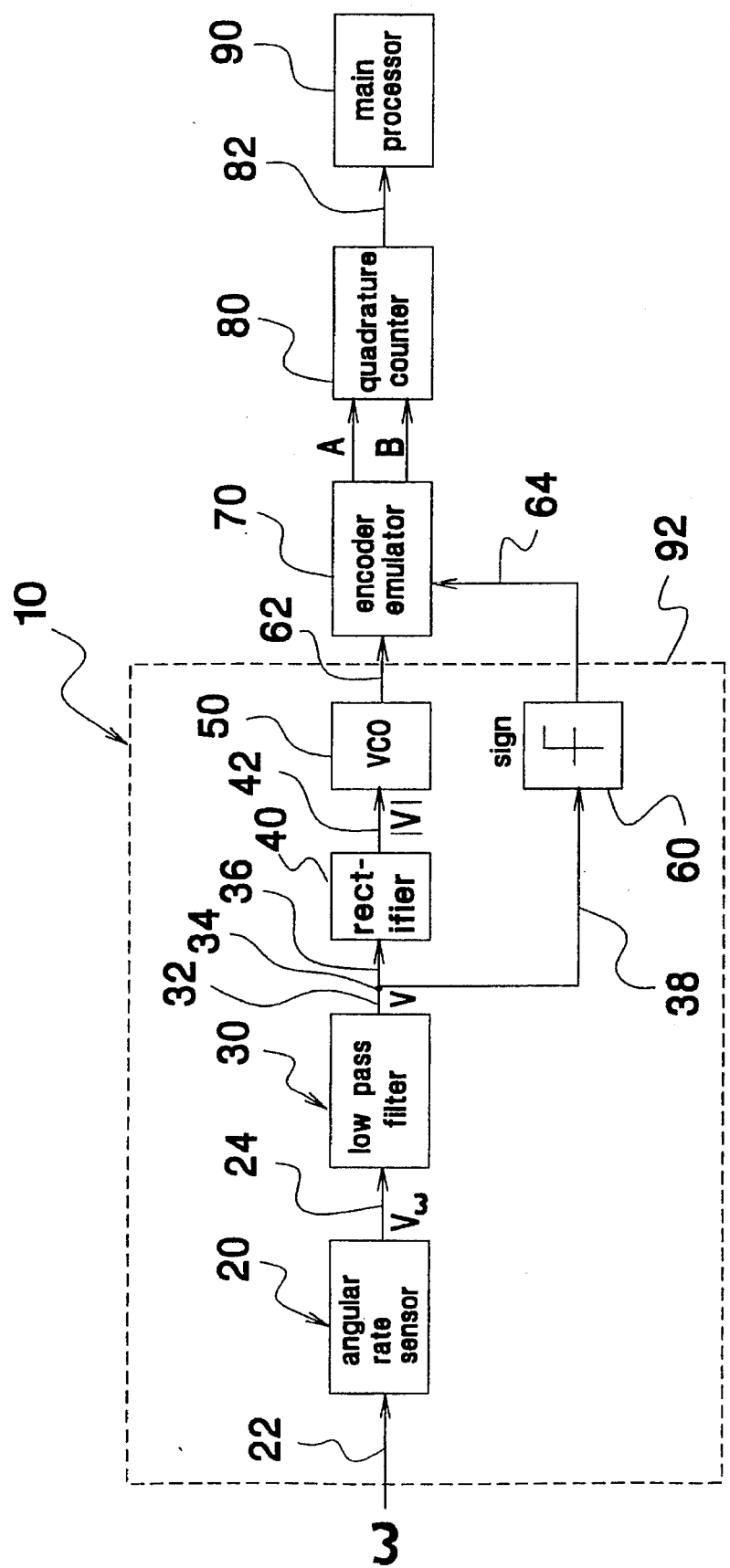
FIG. 1 is a block diagram of a solid state circuit replacement for an inertial table.

Reference is now made to the embodiments illustrated in FIGS. 1–10 wherein like numerals are used to designate like parts throughout. As seen in FIG. 1, an embodiment of the instant invention is described in block diagram format and comprises a solid state strap-down system, such as system 10. System 10 further comprises a vehicle angular rate sensor 20 receiving angular rate ($\omega$) as an input 22 and providing either a positive or negative voltage ($V_\omega$), depending upon direction of turn, output 24 to a low-pass filter/amplifier 30. Output 32 of filter/amplifier 30 is a filtered varying voltage signal (V) derived from output 24 which is split at node 34 into inputs 36 and 38. Input 36 delivers filtered voltage output V from filter/amplifier 30 to rectifier 40. Rectifier 40 rectifies the filtered voltage output to provide an absolute value (|V|) of filtered voltage V on line 42 which connects rectifier 40 to a voltage controlled oscillator, hereafter referenced as VCO 50.

Input 38 delivers output from filter/amplifier 30 to sign circuit 60. An output of VCO 50, line 62, delivers a signal having a frequency which is proportional to the absolute value of filtered voltage V delivered from filter/amplifier 30 to an encoder emulator 70. Also an output 64 from sign circuit 60 delivers a binary signal which is indicative of a direction of angular change to encoder emulator 70.

Encoder emulator 70, as its name implies, generates bi-phasic signals on lines A and B which are delivered to a quadrature counter 80. The bi-phasic signals are of the same nature as signals delivered to a like quadrature counter receiving signals from inertial platforms replaced by the instant invention. Quadrature counter 80 is identical to quadrature counters recording such received signals and therefore an existing quadrature counter used for such purposes may be used in place of quadrature counter 80.

As seen in FIG. 1, an output 82 delivers count information to a main processor 90. Main processor 90 calculates guidance and control parameters used to control movement of the AGV. As such a main processor is now commonly a standard part of such an AGV, it and the guidance process associated with quadrature counter 80 and main processor 90 will not be further treated herein.

To maintain sufficient accuracy throughout a period of normal operation of the AGV, components used in certain portions of system 10 must retain substantially the same parametric values. For example, gains and other operating parameters and therefore resistances should not vary by more than 0.01% throughout operation of the AGV. To assure maintenance of such gains and operating parameters and resistances, a portion of system 10 as shown by dashed lines 92 is precisely temperature controlled. Temperature of parts controlled therein is maintained at approximately 50° C.±0.1° C. An exemplary and important temperature control circuit and associated device is describe hereafter.

Figure 2A:
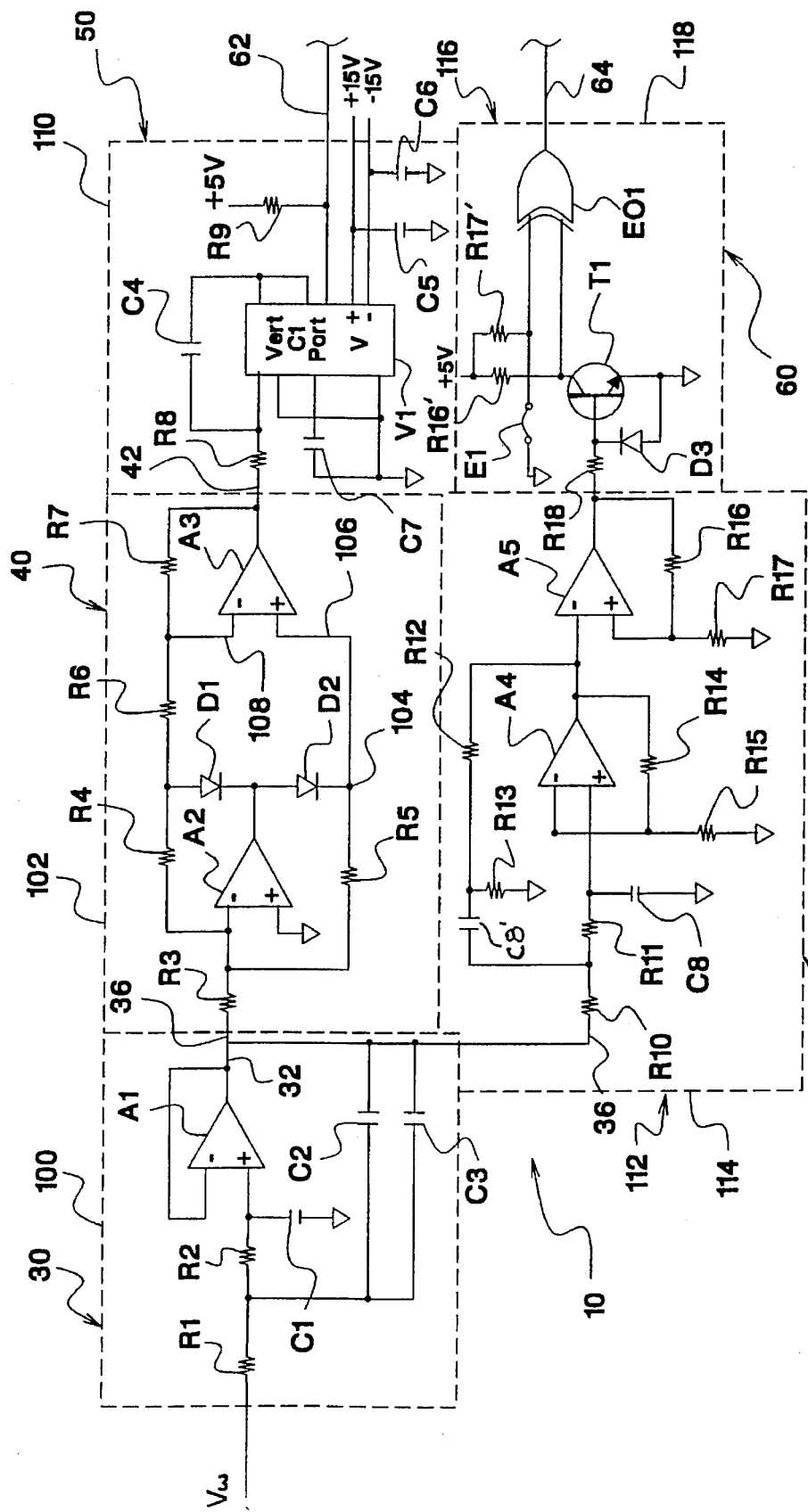
FIGS. 2A and 2B comprise a circuit schematic for the solid state circuit of FIG. 1.
Figure 2B:
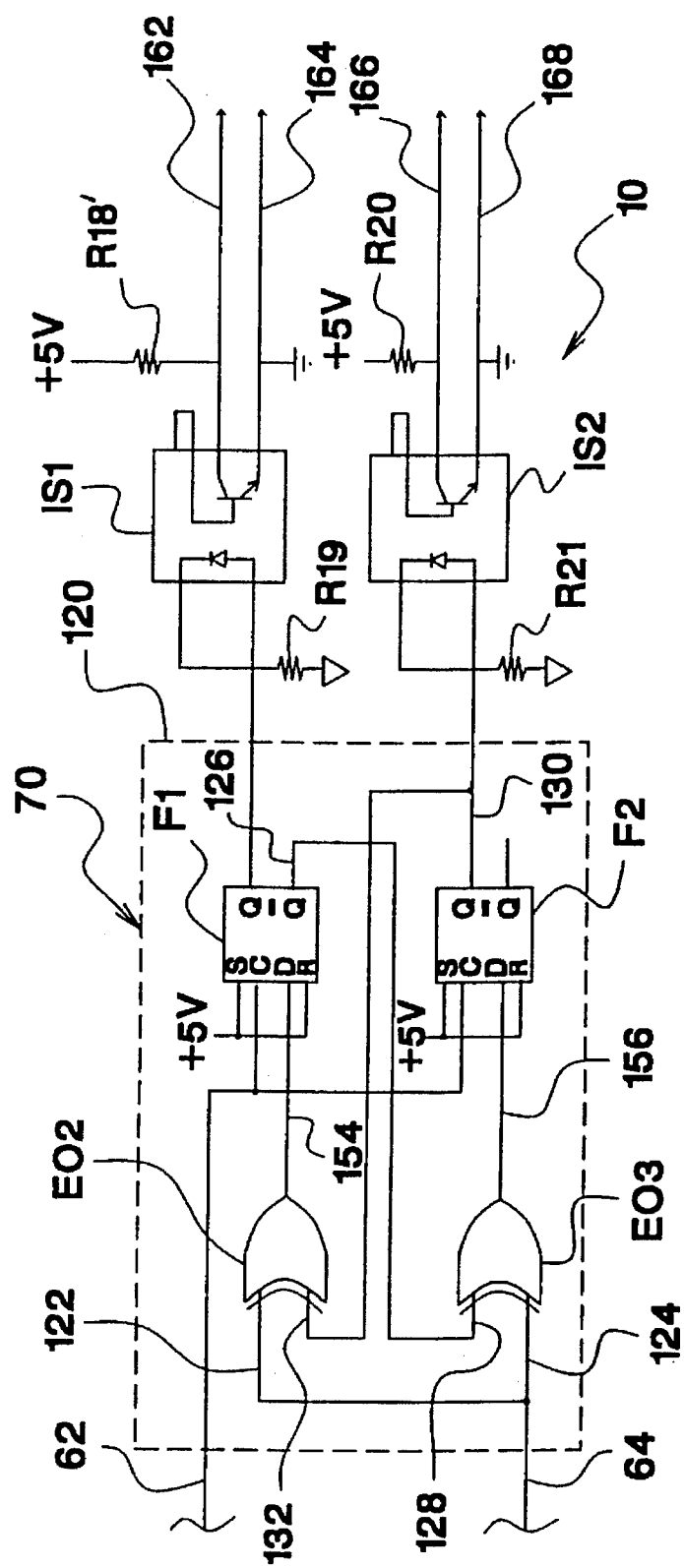

Reference is now made to FIGS. 2, 2A and 2B. FIG. 2 provides relative orientation of FIG. 2A to FIG. 2B, which each comprise a circuit diagram for a portion of system 10. As seen in FIG. 2A, filter 30 is seen to be enclosed by dashed 100. Note that angular rate sensor 20 is not shown in FIG. 2A for simplicity and clarity of presentation. However a more detailed description of a suitable angular rate sensor 20 is provided hereafter. Filter 30 comprises an operational amplifier A1, serially connected resistors R1 and R2, a grounded input capacitor C1 and two feedback capacitors C2 and C3. To aid in making and using the instant invention, a table for each major circuit component is provided herein. However, the invention is not restricted to the components and component values shown and other components and component values may be used as is well known by those skilled in the art. Even so, components and component values must be selected to provide and retain operation accuracy of system 10. Identifying values for circuit components of filter 30 are provided in Table I below:

TABLE I

| Component | Type | Part no./ value | Tolerance |
|---|---|---|---|
| A1 | Operational Amp. | OP77EZ | |
| R1 | Resistor | 1 meg ohm | ±1% TC ≦ 100 ppm/°C. |
| R2 | Resistor | 1 meg ohm | ±1% TC ≦ 100 ppm/°C. |
| C1 | Capacitor | 6800 pF | ±5% C0G |
| C2 | Capacitor | 6800 pF | ±5% C0G |
| C3 | Capacitor | 6800 pF | ±5% C0G |

Rectifier 40 seen enclosed by dashed line 102 comprises operation amplifier A2, an input resistor R3, a pair of feedback resistors, designated R4 and R5, and diodes D1 and D2, disposed as see in FIG. 2. Resistor R5 interconnects to node 104 and from there through lead 106 to a second operational amplifier A3. Output side of R6 connects to operational amplifier A3 through lead 108 and to a feedback resistor R7 (of amplifier A3). Identifying values for circuit components of rectifier 40 are provided in Table II below:

TABLE II

| Component | Type | Part no./ value | Tolerance |
|---|---|---|---|
| A2 | Operational Amp. | OP77EZ | |
| A3 | Operational Amp. | OP77EZ | |
| D1 | Diode | 1N4148 | |
| D2 | Diode | 1N4148 | |
| R3 | Resistor | 10 K ohm | ±1% TC ≦25 ppm/°C. |
| R4 | Resistor | 40.2 K ohm | ±1% TC ≦25 ppm/°C. |
| R5 | Resistor | 40.2 K ohm | ±1% TC ≦25 ppm/°C. |
| R6 | Resistor | 40.2 K ohm | ±1% TC ≦25 ppm/°C. |
| R7 | Resistor | 40.2 K ohm | ±1% TC ≦25 ppm/°C. |

VCO 50 is seen to be enclosed by dashed line 110 in FIG. 2A. Connecting lead 42 from rectifier 40 is connected to input resistor R8 which connects thereafter to a solid state voltage controlled oscillator component V1. Other components used in support of oscillator component V1 comprise a pull-up resistor R9, a feedback capacitor C4, and two filter capacitors C5 and C6 for connecting inputs to +15 and −15 voltage power supply inputs, respectively. One other capacitor C7 is connected as shown in FIG. 2A. Output of oscillator component V1 is transmitted through lead 62 to encoder emulator 70, seen in FIG. 2B. Identifying values for circuit components of VCO 50 are provided in Table III below:

TABLE III

| Component | Type | Part no./ value | Tolerance |
|---|---|---|---|
| V1 | VCO | VFC320CG | |
| R8 | Resistor | 40.2 K ohm | ±1% TC ≦25 ppm/°C. |
| R9 | Resistor | 1 K ohm | ±5% |
| C4 | Capacitor | 0.01 µF | ±5% C0G |
| C5 | Capacitor | 1 µF | ±20% |
| C6 | Capacitor | 1 µF | ±20% |
| C7 | Capacitor | 3300 pF | ±5% C0G |

Sign circuit 60 comprises a high gain and comparator section 112 enclosed by dashed lines 114 and a binary sign generation segment 116 enclosed by dashed lines 118, as seen in FIG. 2A. Section 112 receives input from lead 36, as described above, into a circuit comprising two cascaded operational amplifiers, A4 and A5. Amplifier A4 comprises serially connected input resistors, designated R10 and R11 which are connected to the positive input of amplifier A4. Components in the positive input feedback loop of amplifier A4 are resistors R12 and R13 and capacitor C8' and are connected as seen in FIG. 2A. In like manner, resistors in the negative feedback loop of amplifier A4 are resistors R14 and R15. A filter capacitor C8 is disposed between the positive input to amplifier A4 and resistor R11. Output from amplifier A4 is directly connected to the negative input of amplifier A5. Amplifier A5 puts out an essentially binary signal to line a coupling resistor R18 which interfaces section 112 with segment 116. The circuit of amplifier A5 comprises resistors R16 and R17 in its feedback loop.

Segment 116 provides a binary logic interface for sign input into encoder emulator 70 receiving input through resistor R18 into the base of an NPN transistor T1. Input to transistor T1 also comprises rectifying diode D3. The collector of transistor T1 is directly coupled to one input of a logical two-input EXCLUSIVE OR gate EO1 and to a pull-up resistor R16'.

An EXCLUSIVE OR gate is defined as a gate which receives a pair of binary logic inputs, such as "X" and "Y", and provides a binary logical output of XY+ X'Y', where XY is the AND combination of X and Y and X'Y' is the AND combination of "X not" and "Y not" The "+" -indicating an OR function.

A pull-up resistor R17' is connected to the other input of EXCLUSIVE OR gate EO1. Also the other input is connected through a jumper E1 to ground. Note that removing jumper E1 causes resistor R17' to place a positive voltage upon EXCLUSIVE OR gate EO1 and inverts the logic of the sign output. For this reason if the unit is mounted upside down, jumper E1 is removed to reverse the polarity of the sign. Output of EXCLUSIVE OR gate EO1 is connected to line 64, the logical input to encoder emulator 70 as described above. Identifying values for circuit components of sign circuit 60 are provided in Table IV below:

TABLE IV

| Component | Type | Part no. or value | Tolerance |
|---|---|---|---|
| A4 | Operational Amp. | OPA77EZ | |
| A5 | Operational Amp. | OPA77EZ | |
| T1 | NPN Transistor | 2N3904 | |
| EO1 | EXCLUSIVE OR Gate | SN74LS86 | |
| D3 | Diode | 1N4148 | |
| R10 | Resistor | 1 Meg Ohm | ±1% |
| R11 | Resistor | 1 Meg Ohm | ±1% |
| R12 | Resistor | 301 K Ohm | ±1% |
| R13 | Resistor | 10 K Ohm | ±1% |
| R14 | Resistor | 49.9 K Ohm | ±1% |
| R15 | Resistor | 1.02 K Ohm | ±1% |
| R16 | Resistor | 1 Meg Ohm | ±1% |
| R17 | Resistor | 365 Ohm | ±1% |
| C8 | Capacitor | 6800 pF | ±5% |
| C8' | Capacitor | 6800 pF | ±5% |
| R16' | Resistor | 1 K Ohm | ±5% |
| R17' | Resistor | 1 K Ohm | ±5% |
| R18 | Resistor | 10 K Ohm | ±5% |

Encoder emulator 70, as described above and enclosed by a dashed line 120 in FIG. 2B, receives input from VCO 50 through lead 62 and from sign circuit 60 through lead 64. Lead 62 connects to the clock input of each of two "D" flip-flops F1 and F2. Lead 64 from EO1 is connected into two leads 122 and 124 of each of two EXCLUSIVE OR gates EO2 and EO3, respectively. The Q' (Q not) output 126 of flip-flop F1 is fed back to the second input 128 of EO3. In similar fashion, the Q output 130 of flip-flop F2 is fed back to the second input 132 of EO2. In this fashion a pair of phased signals are generated as seen in FIG. 4.

As seen in FIG. 4, a sign signal 140 carried by lead 64 is represented by either a binary one voltage 142 or a binary zero voltage 144, depending upon direction of turn of the AGV. All signals of emulator 70 comprise such binary signals. Signal output of VCO V1 on lead 62 is a repetitive binary waveform, each oscillation having a rising component 146, a one level 148, a falling component 150 and a zero level 152. As each D flip-flop clocks on a falling signal component, such as component 150, each D flip-flop can change state when a component 150 occurs on the clock. Note that signal 140 is fed through EXCLUSIVE OR gate EO2 to D input 154 of flip-flop F1 and through EXCLUSIVE OR gate EO3 to D input 156 of F2, respectively, as seen in FIG. 2B.

Also, note that when sign signal 140 is a binary zero, and a falling component 150 occurs when the Q states of F1 and F2 are at a zero state, signal 158 representing Q output of F1 on lead 134 is gated to a one state. On the next falling component 150, signal 160 representing Q output of F2 on lead 130 is gated to a one state. Then, when the next falling component occurs, signal 158 returns to the zero state. To complete cycle, on the next falling component 150, signal 160 returns to the zero state.

Conversely, when signal 140 is in the binary one state, and a falling-component 150 occurs when the Q states of F1 and F2 are at the zero state, signal 160 on lead 130 is gated to a one state. On the next falling component 150, signal 158 on lead 134 is gated to the one state. Then, when the next falling component occurs, signal 160 returns to the zero state. To complete cycle, on the next falling component 150, signal 158 returns to the zero state. In this manner, the phasic conditions of signals 158 and 160 are controlled to provide input for quadrature counter 80.

To condition output signals 158 and 160 for ready distribution to quadrature counter 80, each Q output 130 and 134, is connected to an Isolator, seen in FIG. 2B and therein designated as IS2 and IS1, respectively. The circuits for IS1 and IS2 comprise resistors R18' and R19 and R20 and R21, respectively. In this manner emulator 70 determines whether a positive signal from F1 leads or lags a positive going signal from F2, which thereby determines direction of count in quadrature counter 80. Each isolator, IS1 and IS2, comprises a pair of outputs 162 and 164 and 166 and 168 which may be direct inputs to quadrature counter 80. Identifying values for circuit components of encoder emulator 70 and the circuit comprising isolators IS1 and IS2 are providded in Table V, below:

TABLE V

| Component | Type | Part no. or value | Tolerance |
|---|---|---|---|
| EO2 | EXCLUSIVE OR gate | SN74LS86 | |
| EO3 | EXCLUSIVE OR gate | SN74LS86 | |
| F1 | D-Flip Flop | SN74LS74 | |
| F2 | D-Flip Flop | SN74LS74 | |
| IS1 | Optical Isolator | MCT275 | |
| IS2 | Optical Isolator | MCT275 | |
| R18' | Resistor | 2 K Ohm | ±10% |
| R19 | Resistor | 365 Ohm | ±10% |
| R20 | Resistor | 2 K Ohm | ±10% |
| R21 | Resistor | 365 Ohm | ±10% |

Rate sensor 20 for the strap-down system may be Quartz Rate Sensor, QRS11-00100-200, available from Systron Inertial Donner Division, a BEI Electronics Company. Such a rate sensor has the following specifications:

| Parameter | Data |
|---|---|
| Range | ±100°/second |
| Scale Factor | .025V/o/s ± 1% |
| Linearity | <0.05% F.R |
| Sensitive Axis Alignment | <1.0 degrees |
| Output Noise, 0.1 to 100 Hz (Typical) | <0.012°/sec/(Hz)$^{1/2}$ |
| Bandwidth (90° Phase Shift) | >60 Hz |
| Damping Ratio | 0.7 ± .3 |
| Zero Rate Offset Stability (100 seconds at constant temperature) | <0.005°/sec |
| Zero Rate Offset (Temperature coefficient) | <0.01°/s/°C. |
| Zero Rate Offset G Sensitivity, Z Axis | <0.03°/sec/G |
| Temperature Range, Operating | −40° C. to +80° C. |

Concerning systematic error of the system, the output of rate sensor 20 with earth rate as the input (0.0025°) is only 62.5 microvolts, within a circuit which has a noise level of less than one microvolt. Offset errors are not effective because they are mathematically removed by the main processor at each update event in the AGV wherein there is less than sixty seconds between updates. For this reason, the only errors which contribute meaningfully to the inaccuracy of the subsystem are nonlinearities and scaling changes due to temperature change in the system hereafter described in detail. Analog circuitry used in the subsystem is expected to contribute possible error due to a pair of amplifiers and two resistors associated with each amplifier and a voltage to frequency converter which includes a resistor and a capacitor.

Major semiconductor parts which may be used in the subsystem in addition to the currently preferred rate sensor comprise a voltage to frequency converter, VFC320CG, and an operational amplifier, OPA77EZ. Art error analysis for the above named parts on the strap-down gyro, assuming all errors are taken in the positive is calculated using the following table:

| Component | Error Characteristics |
|---|---|
| VFC320CG | Offset drift: .5 ppm/°C. (negligible) Linearity error: 0.002% of full range = gain factor of 1.00002 Gain Drift: 20 ppm/°C. (VCO + Capacitor + Resistor) = 75 ppm/°C. |
| QRS11-00100 | Linearity Error: 0.05% of full range − gain factor of 1.0005 Scale factor TC: 0.03%/°C. Offset drift: 0.005°/s <100 seconds = 0.005°/second between updates |
| OPA77EZ | Offset drift: 0.3 microvolts/°C. for Amplifier A1 (gain of 1), Amplifier A2 (gain of 4), Amplifier A3 (gain of 1) ((1*(0.3 microvolt/°C.) + 0.3 microvolt/°C.)*4 + 0.3 microvolts/ °C.)*1 = 2.7 microvolts/°C. which is equivalent to: (2.7 microvolts/62.5 microvolts) * (.0025°/s) * (ΔT) = .000108°/s/°C. * (ΔT) which is negligible for ΔT < 1° C. |

The maximum gain error ($G_e$) dependent on the change in temperature ($\Delta T$) as calculated in the following equation:

$$1.0002*1.0005*(1 + [0.000075/°C. + .0001/°C.0.0003/°C.]*\Delta T) + = 1.00052*(1 + 0.000475/°C.*\Delta T).$$

Gain drift for amplifiers A1 and A2 each have a maximum of 25 ppm/°C. for each resistor and with four resistors in use for each direction yields a maximum drift of 100 ppm/°C. For this reason, a enclosure 400 in combination with a control circuit 200, both described hereafter in detail, are used to control temperature of temperature sensitive circuit to ±0.1° C. Under such conditions, $G_e$ is approximately 1.00056.

The maximum drift rate due to the subsystem may be calculated as 0.005°/sec. The total maximum heading error ($\theta_{errormax}$) is dependent upon angular velocity ($V_a$) and duration (t) of a move. A time dependent value of ($\theta_{errormax}$) may be calculated as follows:

$$(\theta_{errormax})=0.0005675'V_a*t+0.005°/\text{sec} * t$$

which may be simplified to be a function of angular change in heading ($\Delta\theta$) as:

$$(\theta_{errormax})=0.0005675*\Delta\theta+0.005°/\text{sec} * t.$$

For example, assuming a typical straight move of nine meters @ one meter per second with a five degree change in heading would yield an error of 0.0478°. Likewise, an assumed typical turn move of 7.4 meters at 0.75 meters/second through a 90° turn yields a potential error of 0.100°. Also, an assumed move with a 45° turn at one meter/second would also yield a potential error of 0.100°.

As VFC320CG requires a positive input, both directions of motion is monitored by taking an absolute value of the signal and changing the sign or direction of the count by use of a sign bit. It should be noted that the use of absolute value adds complexity to resultant processing when the gain for positive signals is different than gain for negative signals. For this reason, a scale factor in the microprocessor is used to scale positive and negative counts differently to correct for the directionally different gains.

So that processor 90 stores appropriate scale factors for positive and negative gains which are generally dependent upon departures from absolute values of resistance and capacitance of components selected for the subsystem, system 20 is calibrated as described hereafter. Reference is made to FIG. 3 wherein a vehicle 200' is seen to be rotated 360° in a first direction as shown by arrow 202' and then rotated 360° in a second direction as shown by arrow 204' to provide input to the microprocessor from which scaling factors are calculated. As one who is skilled in the art would understand, any vehicle can be rotated through any known angle of sufficient magnitude to produce measurements from which the scaling factors are calculated. The angles in the two directions do not necessarily have to be of the same size. Of course, an alternative to this calibration method is to use components with values known to be extremely accurate relative to the selected absolute values. However, selection of such components significantly increases component cost and does not allow for changes due to aging and other component value deteriorating causes.

Even so, the maximum deviation ($D_m$) from positive to negative gain is approximately twice the resistor tolerance ($R_{tol}$). In order for $D_m$ to cause a negligible effect, $D_m$ should be <0.02° error for a 90° turn. Equating the 0.02° error to $R_{tol}$, and solving for $R_{tol}$:

$$0.02°=90° * R_{tol} \rightarrow R_{tol}=0.011\%$$

From a nominal value of $R_{tol}$ of 0.01%, a maximum error of 0.018° is calculated. Also for an $R_{tol}$ of 0.1%, a maximum error of 0.18 is calculated. For this reason a tolerance of at least 0.01% is necessary if only a single calibration step is to be taken. It should be noted that resistances and capacitors having such tolerances are currently commercially available.

Reference is now made to FIGS. 5–9 wherein temperature control circuits and devices which maintain a constant temperature within ±0.1° Centigrade are seen. A circuit schematic of a temperature control circuit 200 is provided in FIG. 5. Temperature control circuit 200 comprises a temperature sensing circuit 202 seen enclosed by dashed lines 204, a system ready detection and indicating circuit 206 enclosed by dashed lines 208, a lead-lag amplifier 210 enclosed by dashed line 212 and heating control circuit 214 enclosed by dashed line 216.

Temperature sensing circuit 202 comprises a resistive bridge circuit which comprises a temperature sensor S1 and capacitor C9 disposed between a +5 volt source and an input lead 220 to the positive input of an operational amplifier A6. Also connected to lead 220 is a resistor R18" to a −5 volt supply.

All power supplies used in the instant invention are well regulated. Such power supplies are commercially available.

Also connected to the −5 volt supply is resistor R19' which interconnects the negative input of amplifier A6 through lead 222. The bridge circuit is completed by resistor R20" interconnected between lead 222 and the +5 volt supply. A filter capacitor C10 is disposed between the +5 and −5 volt supplies. A feedback circuit across amplifier A6 comprises resistor R20' and capacitor C11. The output of Amplifier A6 interconnects via lead 224 to system ready detecting and indicating circuit 206 and lead lag amplifier 210.

System ready detecting and indicating circuit 206 comprises an operational amplifier A7 which receives input on its negative input line through a resistor R21' and comprises a feedback resistor R22. Output of amplifier A7 is serially connected via a diode D4 to resistor R22 and an input resistor R23 to the base of a light indicator driving transistor T2 which are part of a light indicator driving circuit. The light indicator driving circuit further comprises diode D5, resistor R24 and indicator light L1.

Lead lag amplifier comprises an RC coupled input comprising resistor R25 and capacitor C12 connected to the negative input of an operational amplifier A8. Disposed in the feedback loop of operational amplifier A8 are serially connected resistor R26 and capacitor C13 and a resistor R27 disposed in parallel to resistor R26 and capacitor C13. The positive input of amplifier A8 is connected to ground through resistor R28. Output of amplifier A8 is connected through lead 226 to the positive input of operational amplifier A9 which is part of a unity gain amplifier which is integral with heating control circuit 214.

Heating control circuit 214 comprises operational amplifier A9, a power transistor T3 and a resistor R29 interposed between output of amplifier A9 and the gate of transistor T3. The drain of transistor T3 is connected through lead 228 to a first resistive element H1 to a power connecting lead 230 which is treated further hereafter. The source of transistor T3 is connected to the negative input of amplifier A9 and to a second resistive heater element H2 through lead 234. Further second heater element H2 is grounded through lead 234'. Identifying values for circuit components of temperature control circuit 200 are found in table VI, below:

TABLE VI

| Component | Type | Part no. of value | Tolerance |
|---|---|---|---|
| A6 | Operational Amp. | OPA77EZ | |
| A7 | Operational Amp. | LF347 | |
| A8 | Operational Amp. | LF347 | |
| A9 | Operational Amp. | LF347 | |
| L1 | LED | HLMP-3519 | |
| T2 | PNP Transistor | 2N306 | |
| T3 | MOSFET Transistor | IRF741 | |
| D4 | Diode | 1N4148 | |
| D5 | Diode | 1N4148 | |
| R18" | Resistor | 147 K OHM | ±1% |
| R19' | Resistor | 147 K OHM | ±1% |
| R20" | Resistor | 147 K OHM | ±1% |
| R20' | Resistor | 1.5 M OHM | ±1% |
| R21' | Resistor | 1 K OHM | ±1% |
| R22 | Resistor | 1 K OHM | ±1% |
| R23 | Resistor | 1 K OHM | ±1% |
| R24 | Resistor | 365 OHM | ±1% |
| R25 | Resistor | 49.9 K OHM | ±1% |
| R26 | Resistor | 0 | |
| R27 | Resistor | 1 M OHM | ±1% |
| R28 | Resistor | 49.9 K OHM | ±1% |
| R29 | Resistor | 10 K OHM | ±10% |
| C9 | Capacitor | .001 µF | ±10% |
| C10 | Capacitor | 10 µF | ±10% |
| C11 | Capacitor | .1 µF | ±10% |
| C12 | Capacitor | .1 µF | ±10% |
| C13 | Capacitor | .1 µF | ±10% |
| S1 | Thermistor | 2322-640-63474 | |

Figure 6:
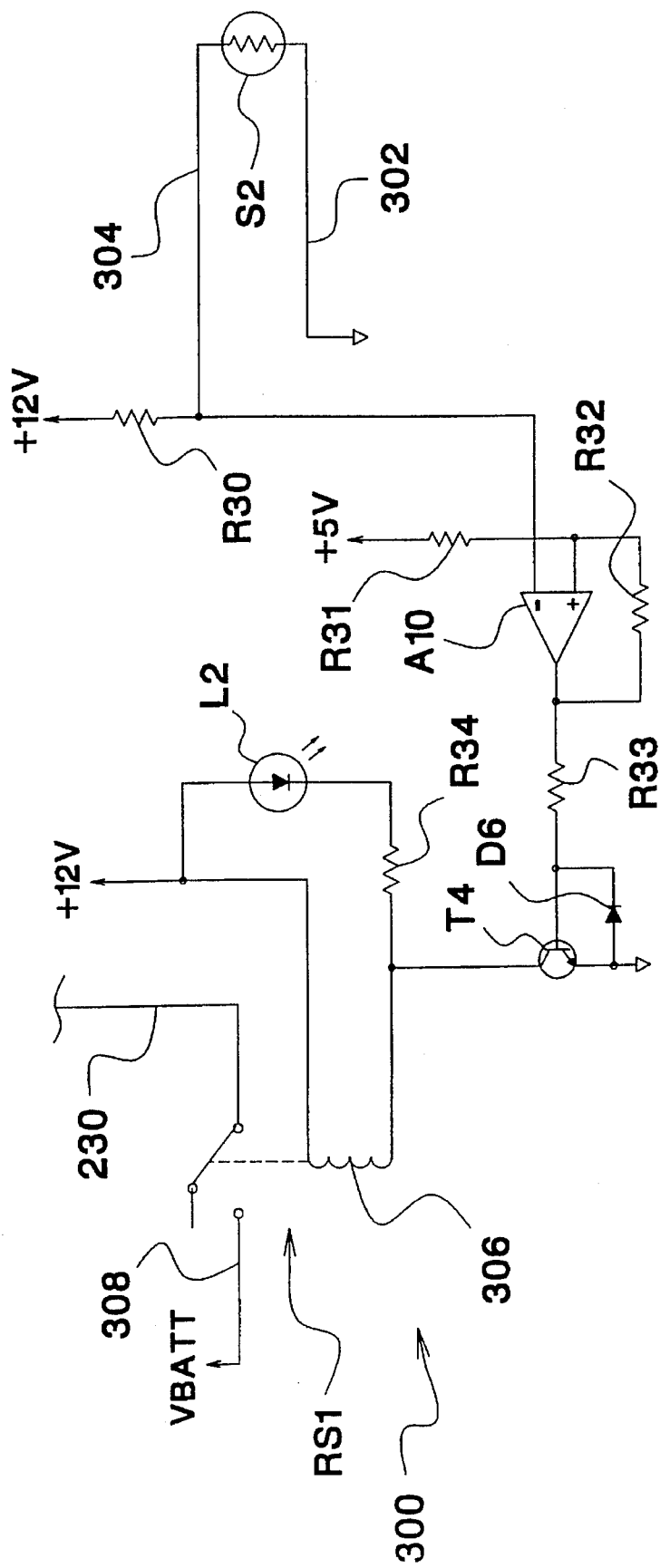
FIG. 6 is a circuit schematic of an over temperature circuit used with the temperature control circuit of FIG. 5.

Reference is now made to FIG. 6 wherein an over temperature circuit 300 is seen. Over temperature circuit 300 comprises a temperature sensor S2, an operational amplifier A10, an NPN transistor T4, a relay switch RS1 and a status indicator L2. As seen in FIG. 6, sensor S2 is grounded on one side by lead 302 while a second lead 304 is directly coupled to the negative input of amplifier A10. Lead 304 is also connected through a resistor R30 to a +12 volt supply. Physical placement of sensor S2 can be seen in FIG. 9.

The positive input of amplifier A10 is connected through a resistor R31 to the +5 volt supply and to a feedback resistor R32 which connects to the output of amplifier A10. The output of amplifier is resistance coupled to the base of transistor T4 through resistor R33. The emitter of transistor T4 is grounded and protected with a diode D6 across the base-emitter terminals, as seen in FIG. 6.

Figure 5:
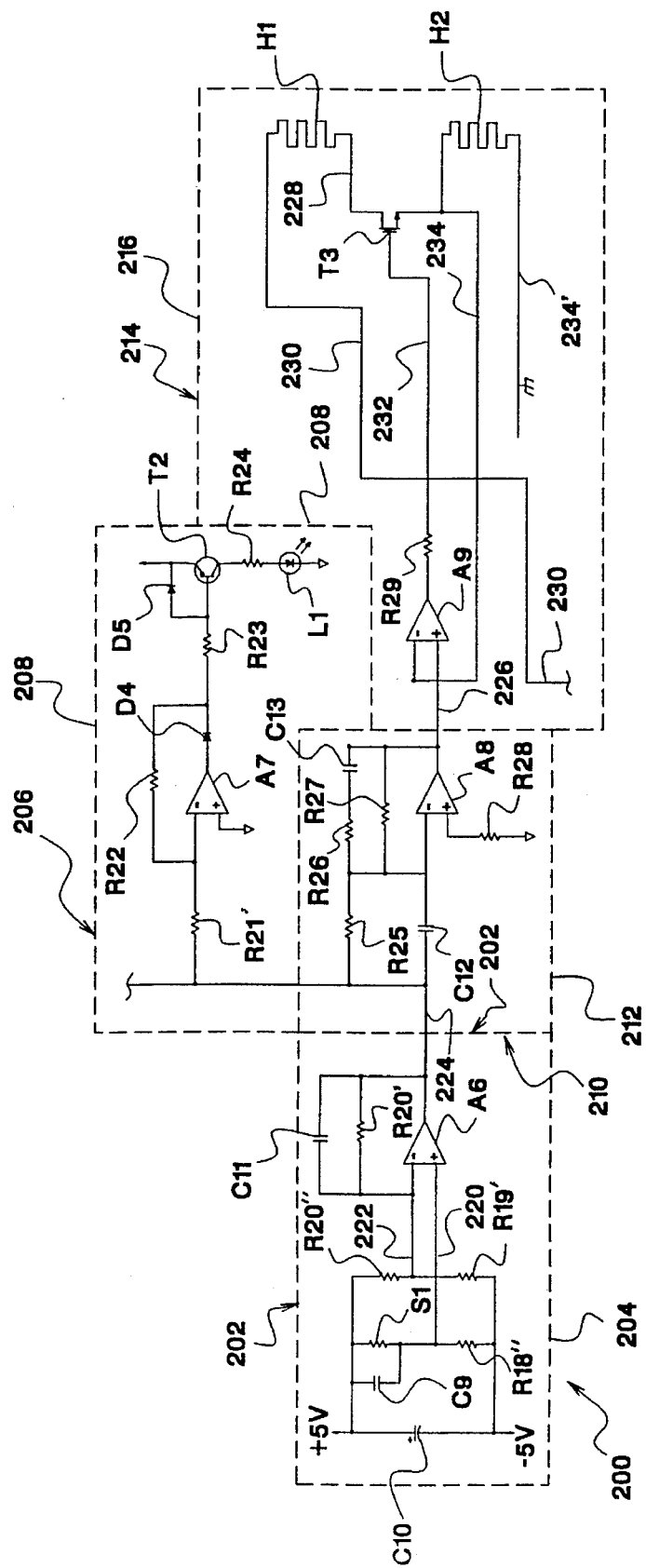
FIG. 5 is a circuit schematic of a temperature control circuit to control temperature controlled parts seen in FIGS. 1 and 2A.

The collector of transistor T4 is directly coupled to a magnetic coil 306 of relay switch RS1. Note that when RS1 is activated a contact is made between a lead 308 which provides a connection between a battery voltage VBATT and lead 230 which provides power for heater elements H1 and H2 as seen in FIG. 5.

In addition, the collector of transistor T4 is connected to an under-temperature indicator, status indicator L2 through resistor R34. Note that an over temperature signal imposes a voltage upon the base of transistor T4 which removes ground from coil 306, dropping out relay switch RS1 and removing power from resistive heater elements H1 and H2. In this manner circuit 300 provides a safety controller for circuits which are temperature controlled by temperature control circuit 200. Identifying values for circuit components of over temperature circuit 300 are found in table VI, below:

TABLE VI

| Component | Type | Part no. or value | Tolerance |
|---|---|---|---|
| A10 | Operational Amp. | LF347 | |
| L2 | LED | HLMP-3519 | |
| T4 | NPN Transistor | 2N3904 | |
| D6 | Diode | 1N4148 | |
| S2 | Temperature sensor | RL3006-50-80-25-PTO | |
| R30 | Resistor | 232 OHM | ±1% |
| R31 | Resistor | 49.9 OGM | ±1% |
| R32 | Resistor | 1 M OHM | ±1% |
| R33 | Resistor | 10 K OHM | ±10% |
| R34 | Resistor | 1 K OHM | ±10% |

Figure 9:
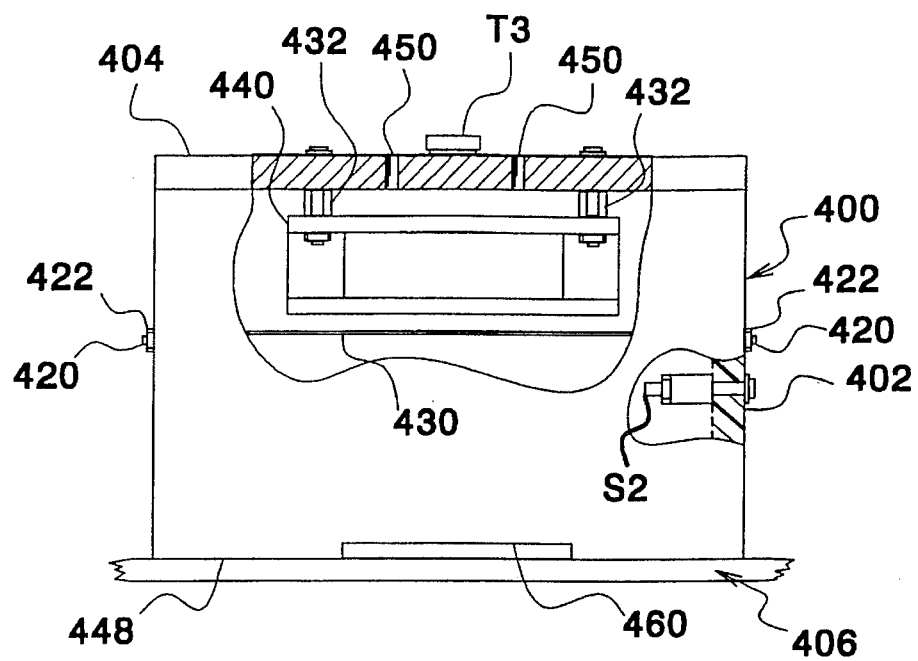
FIG. 9 is a side elevation of the enclosure, with a section removed to show relative position of a fan and heater elements associated with the temperature control enclosure.
Figure 10:
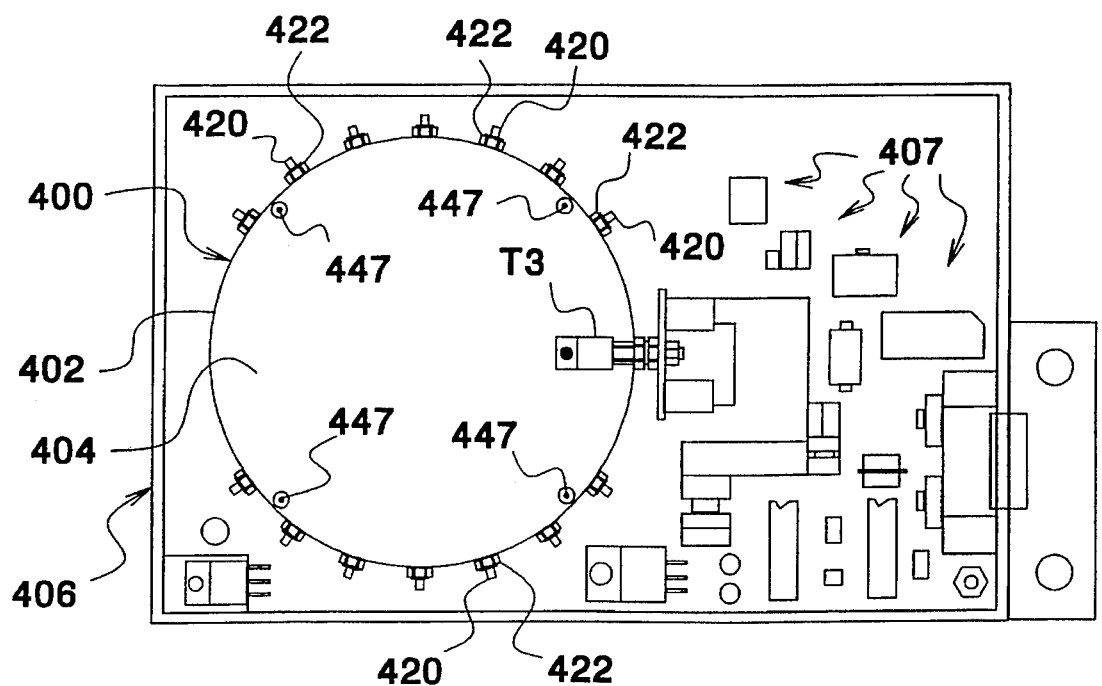
FIG. 10 is a top view showing the temperature controlling enclosure covering that portion of a printed wiring board which contains temperature controlled parts.

Reference is now made to FIGS. 8–10 wherein a temperature enclosure 400, used in conjunction with temperature control circuit 200 and over temperature control circuit 300 is seen. As best seen in combination in FIGS. 7 and 9 enclosure 400 comprises a round cylindrical part 402 and a flat circular top cover 404. In all cases, wires providing electrical connection to parts associated with enclosure 400 have been removed for clarity of presentation as one who is skilled in the electrical and electronic control art can accomplish such connections without excessive experimentation.

As best seen in FIG. 10, enclosure 400 is sized to cover and enclose a section of a printed circuit board 406. Board 406 may be generally of such a size to accomodate all of the components of system 10 including those components on board 406 not temperature controlled. The non temperature controlled components are generally designated 407. However, under some circumstances more than one circuit board may be used. Even so, it is preferred that all of the components which are to be temperature controlled be on a single board for efficiency of operation.

Round cylindrical part 402 is made of a non-conductive, relatively non-temperature conductive material, such as a phenolic. Top cover 404 is made of heat conductive material such as aluminum and serves not only as an enclosure, but as a heat sink for transistor T3, as described in more detail hereafter. In FIG. 7, round cylindrical part 402 is seen to comprise an interior side 408 and an exterior side 409.

Temperature control parts associated with enclosure 400 comprise a plurality of solder terminals 410 anchored at the interior side 408 of part 402 by pan-head screws 420 and hex nuts 422. Resistive heater elements H1 and H2 are formed of electrically isolated Nichrome 60 wire, generally designated 430. Interiorly attached to top plate 404 by stand-offs, generally designated 432, is an axial flow fan 440, best seen in FIG. 9.

As seen in FIG. 10, enclosure 400 is disposed over a portion of printed circuit board 406 making contact with board 406 at a bottom edge 448 of cylindrical part 402, as seen in FIG. 9. Thereat, enclosure 400 is removably, but firmly affixed to board 406 by screws or the like.

As seen in FIG. 9, top cover plate 404 comprises a plurality of small holes 450 (preferably fewer in number than eleven, with a diameter not greater than 0.25 inches. Transistor T3 is mounted in heat-conductive contact with top cover plate 404 to remove excess heat produced in transistor T3 during operation. Cover plate 404 is releasibly, but securely affixed to cylindrical part 402 by allen head screws 447 or the like.

In addition, a portion of bottom edge 448 is removed such that a slot 460 is formed between bottom edge 448 and board 406 when cylindrical part 402 is attached thereto. Slot 460 in conjunction with small holes 450 provide a controlled, but limited pathway for air to flow from the exterior of enclosure 400 as directed by fan 440 across heater elements H1 and H2 (wire 430) into contact with temperature controlled parts to exit through slot 460. In this manner, using exquisite control of the heat producing current through heater elements H1 and H2 by temperature control circuit 200, the temperature of components of angular rate sensor 20, low pass filter 30, rectifier 40, sign circuit 60 and voltage controlled oscillator 50 is maintained at a prespecified temperature ±0.1 ° C.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A strap-down inertial table system having no moving parts, other than sensing parts of an angular rate sensor, which is a direct and compatible substitute for an inertial table being used in an unmanned automatically guided vehicle and having moving parts, said strap-down table system comprising:

an angular rate sensor which provides an output voltage which is a function of angular rate and direction of turning;

low pass means for filtering said output voltage to produce a filtered output voltage;

means for dividing the filtered output voltage from said filtering means into at least two electrical signal pathways;

means for rectifying a signal from one of such pathways to remove direction of turning;

a voltage-controlled-oscillator which receives a voltage signal from said rectifying means and produces a frequency signal proportional to the voltage of the received signal;

means for translating polarity of a signal from another of such signal pathways and producing a binary signal indicative of direction of turning;

means for receiving and processing said frequency signal and said binary signal to produce an output which emulates an encoder output;

means for connecting said emulated encoder output to a quadrature counter to thereby deliver encoded emulations of output of the moving part inertial table to a controlling navigation and guidance processor.

2. The strap-down inertial table system according to claim 1 further comprising a means for maintaining temperature of said angular rate sensor, said filtering means, said rectifying means, said polarity translating means and said voltage-controlled-oscillator within a 50° C.±0.1° C. range.

3. The strap-down inertial table system according to claim 2 wherein said temperature maintaining means comprise means for sensing a temperature which exceeds a safe operating temperature, said temperature sensing means comprising means for removing power from heater elements of said temperature maintaining means.

4. The strap-down inertial table system according to claim 1 wherein said temperature maintaining means comprise means for enclosing said angular rate sensor, said filtering means, said rectifying means, said binary signal producing means and said voltage-controlled oscillator and means for forcing flow of air through said enclosing means.

5. The strap-down inertial table system according to claim 4 wherein said air flow forcing means comprise an axial fan.

6. The strap-down inertial table system according to claim 1 wherein said angular rate sensor, said filtering means, said rectifying means, said binary signal producing means and said voltage-controlled oscillator are all mounted on a printed circuit board which is horizontally disposed and rigidly attached to a vehicle.

7. The strap-down inertial table system according to claim 1 wherein said receiving and processing means in combination with said polarity translating means comprise means for compensating for inverted mounting of said printed circuit board.

8. A no-moving part, strap-down inertial table system for sensing rate of turning of an AGV, said table comprising:

an angular rate sensor which provides a voltage output which is a function of angular rate and direction of turning;

means for low-pass filtering said voltage;

means for dividing a filtered voltage output from said filtering means into at least two electrical signal pathways;

means for rectifying a signal from one of such pathways to remove direction of turning;

a voltage-controlled-oscillator which receives a voltage signal from said rectifying means and produces a frequency signal proportional to the voltage of the received signal;

means for translating polarity of a signal from another of such pathways and producing a binary signal indicative of direction of turning;

means for receiving and processing said frequency signal and said binary signal to produce an output which emulates an encoder output;

means for accumulating output of said encoder emulation for use by a navigation and control processor.

9. The strap-down inertial table system according to claim 8 further comprising a means for maintaining temperature of said angular rate sensor, said filtering means, said rectifying means, said polarity translating means and said voltage-controlled-oscillator within a 50° C. ±0.1° C. range.

10. The strap-down inertial table system according to claim 9 wherein said temperature maintaining means comprise means for sensing a temperature which exceeds a safe operating temperature, said temperature sensing means comprising means for removing power from heater elements of said temperature maintaining means.

11. The strap-down inertial table system according to claim 8 wherein said temperature maintaining means comprise means for enclosing said angular rate sensor, said filtering means, said rectifying means, said binary signal producing means and said voltage-controlled oscillator and means for forcing flow of air through said enclosing means.

12. The strap-down inertial table system according to claim 11 wherein said air flow forcing means comprise an axial fan.

13. The strap-down inertial table system according to claim 8 wherein said angular rate sensor, said filtering means, said rectifying means, said binary signal producing means and said voltage-controlled oscillator are all mounted on a printed circuit board which is horizontally disposed and rigidly attached to a vehicle.

14. The strap-down inertial table system according to claim 8 wherein said receiving and processing means in combination with said polarity translating means comprise means for compensating for inverted mounting of said printed circuit board.

15. An unmanned automated guided vehicle comprising:
a navigation and guidance computer processor;
a no-moving part, strap-down inertial table comprising:
- an angular rate sensor which provides a voltage output which is a function of angular rate and direction of turning;
- means for low-pass filtering said voltage;
- means for dividing a filtered voltage output from said filtering means into at least two electrical signal pathways;
- means for rectifying a signal from one of such pathways to remove direction of turning;
- a voltage-controlled-oscillator which receives a voltage signal from said rectifying means and produces a frequency signal proportional to the voltage of the received signal;
- means for translating polarity of a signal from another of such pathways and producing a binary signal indicative of direction of turning;
- means for receiving and processing said frequency signal and said binary signal to produce an output which emulates an encoder output;
- means for accumulating output of said encoder emulation for use by a navigation and control processor.

16. A method for replacing an AGV inertial table comprising moving parts with a strap-down inertial table system having no moving parts, other than sensing parts of an angular rate sensor, comprising the following steps:
- removing the inertial table comprising moving parts;
- providing the strap-down inertial table system comprising:
  - an angular rate sensor which provides a voltage output which is a function of angular rate and direction of turning;
  - means for low-pass filtering said voltage;
  - means for dividing a filtered voltage output from said filtering mean into at least two electrical signal pathways;
  - means for rectifying a signal from one of such pathways to remove direction of turning;
  - a voltage-controlled-oscillator which receives a voltage signal from said rectifying means and produces a frequency signal proportional to the voltage of the received signal;
  - means for translating polarity of a signal from another of such pathways and producing a binary signal indicative of direction of turning;
  - means for maintaining temperature of said angular rate sensor, said filtering means, said rectifying means, said voltage-controlled-oscillator and said polarity translating and binary signal producing means at a predetermined temperature within predetermined tolerances such that necessary AGV turning accuracy measurements are realized;
  - means for receiving and processing said frequency signal and said binary signal to produce an output which emulates an encoder output;
  - means for connecting said emulated encoder output to a quadrature counter used previously as output from the removed inertial table to deliver encoded emulations of output of the moving part inertial table to a controlling navigation and guidance processor.

17. A method of calibrating a strap-down inertial table having no moving parts such that low-cost parts comprising resistors and capacitors, having tolerance specifications not more restrictive than 1% and 5%, respectively, can be used without selection in such table comprising the steps of:
- providing the no-moving part, strap-down inertial table comprising an angular rate sensor which emits a voltage relative to change in angular rate, means for low-pass filtering said voltage, means for determining direction of change in angular rate from said voltage, means for removing direction from said voltage, means for emulating an output of an angular rate encoder utilizing output from the determining and removing means and means for connecting to a quadrature counter from the emulating means;
- providing a means of storing and processing calibration data which is attached to said quadrature counter;
- mounting said inertial table aboard a controllable vehicle which is free to move and to turn;
- turning said vehicle through a first angle of known magnitude in a first direction and storing output of said quadrature counter in said processor;
- turning said vehicle through a second known angle of known magnitude in a second direction which is opposite the first direction and storing output of said quadrature counter in said processor;
- calculating calibrating variances between direction of turn for use when measuring rate of turn by said inertial table.

18. The method according to claim 17 wherein in at least one of said turning steps the turning angle is 360°.

19. A solid state, no moving part inertial platform for an AGV comprising:
- solid state means for receiving and processing an output voltage from an angular rate sensor comprising:
  - means for translating said output voltage to a frequency proportional to absolute rate of turning of the AGV;
  - means for determining direction of turning of the AGV;
  - means for maintaining temperature of said solid state means within a predetermined temperature range;
- means for receiving output from said solid state means and emulating an encoder for delivery to a quadrature counter.

* * * * *